Figure 4:
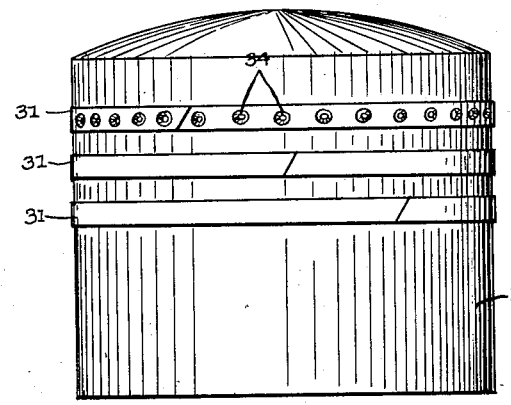

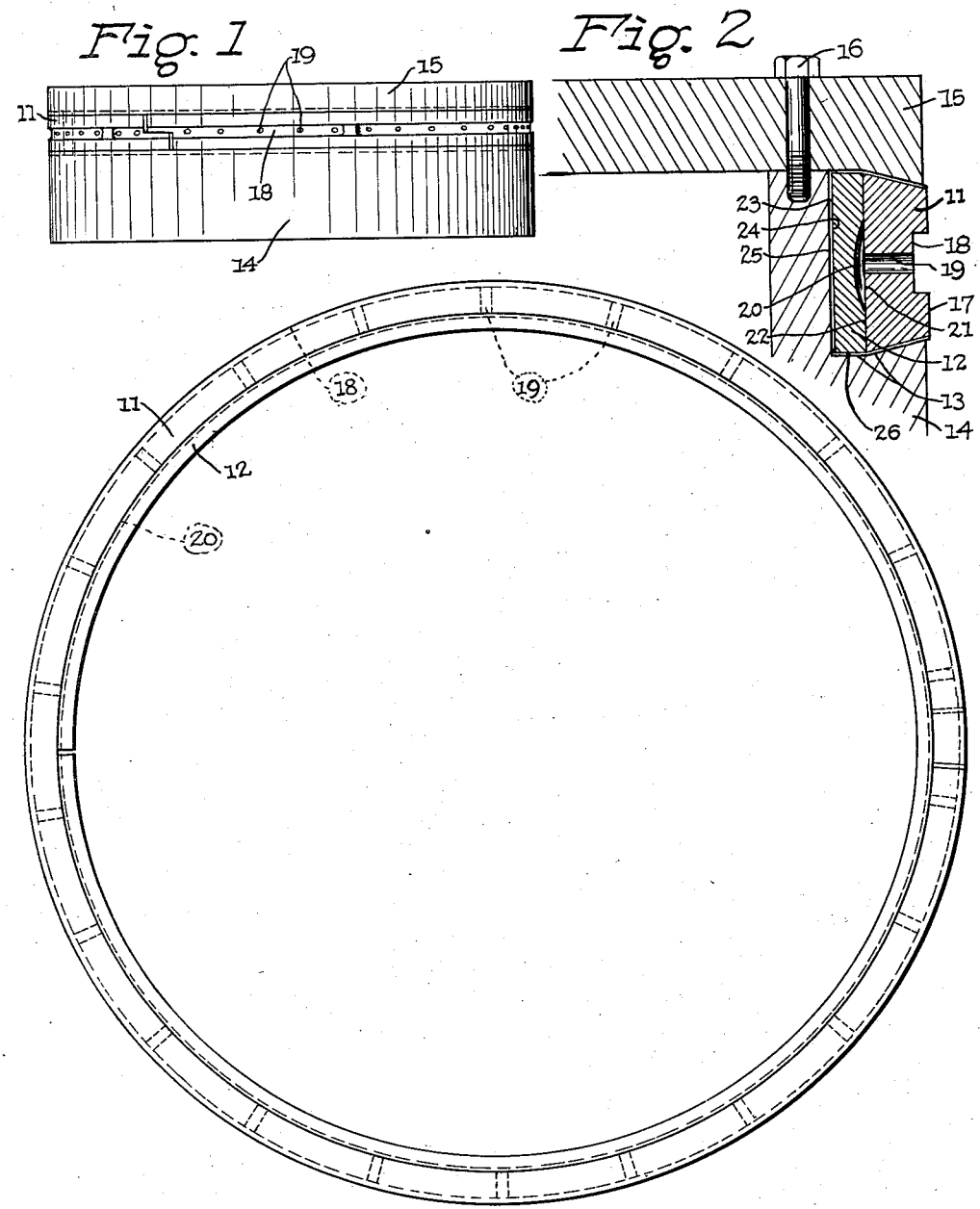

Dec. 22, 1925.

C. H. GERSTING

PISTON RING

Filed Jan. 5, 1924

1,566,531

2 Sheets-Sheet 2

Charles H. Gersting
Inventor by

Attys.

Patented Dec. 22, 1925.

1,566,531

UNITED STATES PATENT OFFICE.

CHARLES H. GERSTING, OF BUFFALO, NEW YORK.

PISTON RING.

Application filed January 5, 1924. Serial No. 684,658.

*To all whom it may concern:*

Be it known that I, CHARLES H. GERSTING, a citizen of the United States, residing at Buffalo, in the county of Erie and State of New York, have invented a certain new and useful Improvement in Piston Rings, of which the following is a full, clear, and exact description, reference being had to the accompanying drawings.

Figure 5:
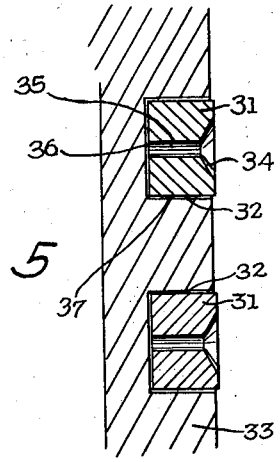
Figure 6:
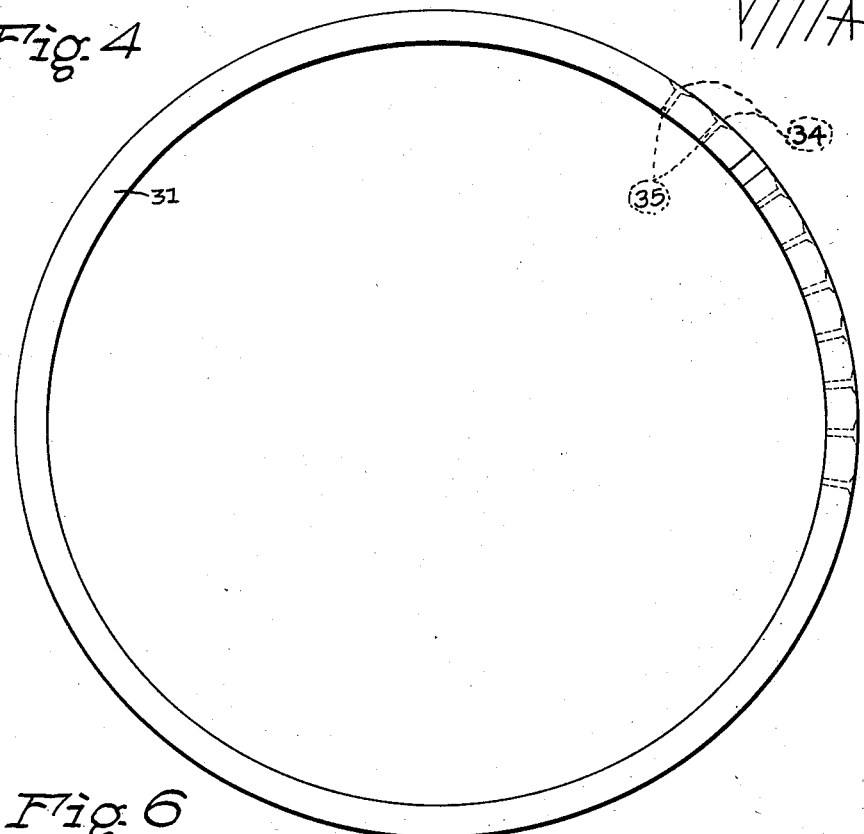

Under ordinary conditions the fluid within a cylinder is afforded access to the inner face of the piston ring and in such manner that substantially the full pressure within the cylinder is transmitted to the inner face of the ring and acts to press the outer face of the ring against the cylinder wall. In order to prevent a piston ring from twisting and turning it is necessary to form the ring of appreciable width and accordingly it is necessary to form this inner face of the piston ring of considerable area with the result that the outer face of the piston ring is usually pressed against the cylinder wall with a pressure far in excess of that required to effect a proper seal. It is of course well known that the total frictional loss is proportional to the total pressure with which the surfaces are held against each other and accordingly it is readily apparent that this great excess of pressure of the outer face of the piston ring against the cylinder wall causes great excess of frictional loss. My invention provides a ring which offers the requisite resistance to twisting and turning yet materially and appreciably reduces the net force with which the fluid presses the outer face of the ring against the cylinder wall and therefore appreciably reduces the excessive loss resulting from the friction between the piston ring and the cylinder wall. In the drawings accompanying this specification and forming a part thereof I have shown, for purposes of illustration, two forms which my inventive concept may assume. In these drawings:

Figure 1 is a side elevation of a piston showing one embodiment of my invention, Figure 2 is an enlarged fragmentary section through the device shown in Figure 1, Figure 3 is a side elevation of the ring shown in Figure 1, while Figures 4, 5, and 6 are views similar to Figures 1, 2, and 3, but showing the second embodiment of my invention.

The embodiment of my invention shown in Figure 1 is particularly adapted for use on the piston of a steam engine and comprises an outer or bearing ring 11 preferably formed of suitable low friction material and therefore not possessed of sufficient resiliency to form a tight seal with the cylinder wall before or at the time the fluid is being introduced into the cylinder and accordingly preferably supplemented by an inner ring 12 of resilient material arranged to constantly urge the outer ring 11 into contact with the cylinder wall. I have herein shown these two rings as seated in a recess 13 in the end of the piston 14 and held in position in this recess by means of a plate 15 secured to the piston 14 by means of a plurality of bolts 16.

The ring 11 herein illustrated is formed of the usual width and accordingly of a width sufficient to prevent twisting and turning of the ring but the total action of the fluid tending to force the ring 11 against the cylinder wall is decreased by providing in the outer face 17 of the ring 11 a depression 18 preferably disposed centrally of the face 17 and connected by means of a plurality of apertures 19 with an annular chamber 20 disposed between the inner face 21 of the outer ring 11 and the outer face 22 of the inner ring 12 and formed herein by recessing the outer face 22 of the inner ring 12. This annular chamber 20 extends the entire length of the inner ring 12 and is therefore open at the ends of the ring 12 and in this manner is in communication with the space 23 between the inner face 24 of the inner ring 12 and the outer face 25 of the piston 14. This space 23 is obviously in communication through the space 26 with the interior of the cylinder.

In the embodiment disclosed in Figures 4, 5, and 6 I have shown my invention applied to a piston ring arranged more particularly for use with an internal combustion engine. This form of my invention comprises a one piece ring 31 arranged to seat within a suitable recess 32 in the piston 33 and provided on its outer face with a plurality of conical depressions 34 each connected by means of an aperture 35 with the inner face of the ring 31 and in this manner with the space 36 present between the ring 31 and the piston 33 and in communication through the space 37 with the interior of the cylinder.

From the above description it will be understood that in the modification shown in Figures 1 through 3 the fluid will enter the chamber 23 through the space 26 and press against the inner face of the piston ring all in the usual manner but it will be obvious that the fluid will also pass through the annular chamber 20 and the apertures 19 into the depression 18 where it will act against the depressed portion of the outer face of the piston ring. Similarly, it will also be understood that in the embodiment of my invention disclosed in Figures 4 through 6 the fluid will enter the space 36 through the space 37 and press against the inner face of the piston ring but it will be obvious that the fluid will also pass through the apertures 35 into the depressions 34 and act over the area of these depressions to press the piston ring inwardly.

It will therefore be apparent that in either modification the fluid will act over the area of the depression to press the ring inwardly against the outwardly pressing action of the fluid against the inner face of the piston ring and that this inwardly pressing action of the fluid will partially counteract the force with which the piston ring is pressed against the cylinder wall and therefore greatly reduces the total friction between the piston ring and the cylinder wall and the loss of power and other ills resulting therefrom.

It will be obvious to those skilled in the art that the embodiments of my invention herein disclosed may be variously changed and modified without sacrificing the advantages of my invention or departing from the spirit thereof and it will therefore be understood that the disclosure herein is illustrative only and that my invention is not limited thereto.

I claim:

In combination: a piston provided with a piston ring groove; a relatively low friction soft non-resilient outer ring disposed in said groove, provided on its outer face with a central annular recess extending the entire periphery of said ring, and provided with a plurality of apertures leading from said recess to the inner face of said ring; and a highly resilient split inner ring disposed in said groove with its outer face engaging the inner face of said outer ring, effective to hold said outer ring in contact with the cylinder wall, and provided on its outer face with a single central annular recess lying in communication with the inner ends of all of said apertures and extending the entire periphery of said inner ring.

In testimony whereof, I hereunto affix my signature.

CHARLES H. GERSTING.